United States Patent [19]

Konecny

[11] Patent Number: 4,774,428

[45] Date of Patent: Sep. 27, 1988

[54] COMPACT THREE-PHASE PERMANENT MAGNET ROTARY MACHINE HAVING LOW VIBRATION AND HIGH PERFORMANCE

[75] Inventor: Karl F. Konecny, Portland, Oreg.

[73] Assignee: Synektron Corporation, Portland, Oreg.

[21] Appl. No.: 50,754

[22] Filed: May 15, 1987

[51] Int. Cl.$^4$ .............................................. H02K 3/00
[52] U.S. Cl. ............................... 310/198; 310/67 R; 310/156; 310/184; 310/203
[58] Field of Search ........................ 310/198, 200–208, 310/180, 184, 185, 126, 67 R, 154, 156, 268, 195, 179, 254, 261, 259

[56] References Cited

U.S. PATENT DOCUMENTS

| | | | |
|---|---|---|---|
| 3,794,870 | 2/1974 | Broadway | 310/198 |
| 4,161,683 | 6/1979 | Stroud | 310/198 |
| 4,188,556 | 2/1980 | Hahn | 310/154 |
| 4,255,682 | 3/1981 | Toida | 310/198 |
| 4,260,923 | 4/1981 | Rawcliffe | 310/198 |
| 4,354,127 | 10/1982 | Stroud | 310/208 |
| 4,402,129 | 9/1983 | Kreuzer | 310/184 |
| 4,437,029 | 3/1984 | Ban et al. | 310/54 |
| 4,532,449 | 7/1985 | Aoki | 310/198 |
| 4,540,906 | 9/1985 | Blom | 310/67 R |
| 4,647,802 | 3/1987 | Konecny | 310/168 |

Primary Examiner—R. Skudy
Attorney, Agent, or Firm—Chernoff, Vilhauer, McClung & Stenzel

[57] ABSTRACT

A compact three-phase permanent magnet rotary machine having minimal reluctance torque and electromagnetic torque ripple, and maximum energy efficiency and starting torque per unit volume of winding, comprises an armature having $3(2n+1)$ ferromagnetic poles and slots and a permanent magnet assembly having $3(2n+1)\pm1$ permanent magnet poles, where n is an integer of 1 or more. Each of the three phases of the winding comprises multiple coils, each wound about a respective ferromagnetic pole and occupying a pair of slots located immediately on each side of a respective pole. The coils of a particular phase are located within a sector of the circular array of ferromagnetic poles encompassing $2n+1$ poles.

2 Claims, 2 Drawing Sheets

COMPACT THREE-PHASE PERMANENT MAGNET ROTARY MACHINE HAVING LOW VIBRATION AND HIGH PERFORMANCE

BACKGROUND OF THE INVENTION

This invention relates to improvements in three-phase permanent magnet rotary electrical machines such as motors and generators. More particularly, the invention relates to such improvements which minimize reluctance torque and electromagnetic torque ripple while maximizing compactness, energy efficiency and motor starting torque per unit volume of winding.

Permanent magnet motors having slotted armatures and multi-coil phases have been produced in the past utilizing an odd number of slots and armature poles and an even number of permanent magnet poles to reduce reluctance torque and thus vibration, as exemplified by the motors shown in Ban U.S. Pat. No. 4,437,029 and Aoki U.S. Pat. No. 4,532,449. However, the coils of the windings for such motors are either superimposed upon each other or, if not superimposed, require the use of more than three phases. In the former case, the superimposed coils tend to maximize the amount of wire in the winding, thereby maximizing both its volume and impedance and minimizing its efficiency and torque (or emf) per turn. In the latter case, the large number of phases is undesirable due to the need for a correspondingly high number of phase-switching circuits which add complexity and expense.

Three-phase permanent magnet motors, having multi-coil phases wherein the individual coils are not superimposed upon each other, have been designed as shown in FIGS. 2, 2A and 2B herein. However, even though the coils do not overlap, the phases do overlap since the coils of one phase are interstitially inserted between the coils of another phase. Such winding configuration, although minimizing self-inductance which is beneficial in high-speed applications, produces electromagnetic torque ripple and reduced starting torque per unit volume of wire, both of which are disadvantageous in many applications.

Conversely, motors having equal numbers of armature slots and permanent magnet poles, as exemplified by Hahn U.S. Pat. No. 4,188,556, are characterized by considerable reluctance, or "cogging", torque which produces harmful vibration in many applications.

Accordingly, a need exists for a three-phase, permanent magnet rotary electrical machine which compatibly satisfies all of the objectives of compactness, minimal reluctance torque and electromagnetic torque ripple, and maximum energy efficiency and starting torque per unit volume of wire.

SUMMARY OF THE INVENTION

The present invention provides a unique combination of features which compatibly satisfies all of the foregoing competing objectives in a three-phase permanent magnet rotary machine such as a motor or generator. The machine may have an armature which is either internal or external relative to the permanent magnet assembly, and may have either a radial or an axial gap. Pursuant to the principles of the invention, an armature, having a ferromagnetic core with $3(2n+1)$ protruding ferromagnetic poles arranged in a circular array separated from each other by a like number of slots, and a permanent magnet assembly having a circular array of $3(2n+1)\pm 1$ magnetic poles, are mounted for relative rotation with respect to each other, n being an integer of one or more. This structure enables the utilization of three phases, each having multiple coils, in combination with permanent magnet poles of a slightly different number than the ferromagnetic poles of the armature, so that the magnitude of the reluctance torque is minimized while its frequency per revolution is maximized. Compactness and high energy efficiency of the three-phase winding is achieved by winding each coil of each phase about a respective ferromagnetic armature pole so that each coil occupies a pair of slots located immediately on each side of the respective armature pole. This structure avoids any overlapping of the respective coils, thereby minimizing the volume of coil wire and thereby also minimizing the impedance of the winding while maximizing its efficiency and torque (or emf) per turn.

The minimizing of electromagnetic torque ripple and the maximizing of starting torque per unit volume of wire are achieved by concentrating the coils of each phase into a limited sector of the armature so that the phases, as well as their individual coils, do not overlap each other. This is achieved by making the coils of each phase occupy $2n+2$ armature slots located within a sector of the armature poles which encompasses only $2n+1$ armature poles, and winding the coils with alternating polarities. Although such close placement of coils of alternating polarity increases the self-inductance of each phase, the resultant increase in impedance is insignificant except at unusually high motor speeds.

The foregoing and other objectives, features and advantages of the present invention will be more readily understood upon consideration of the following detailed description of the invention, taken in conjunction with the accompanying drawings.

DETAILED DESCRIPTION OF THE INVENTION

Figure 1:
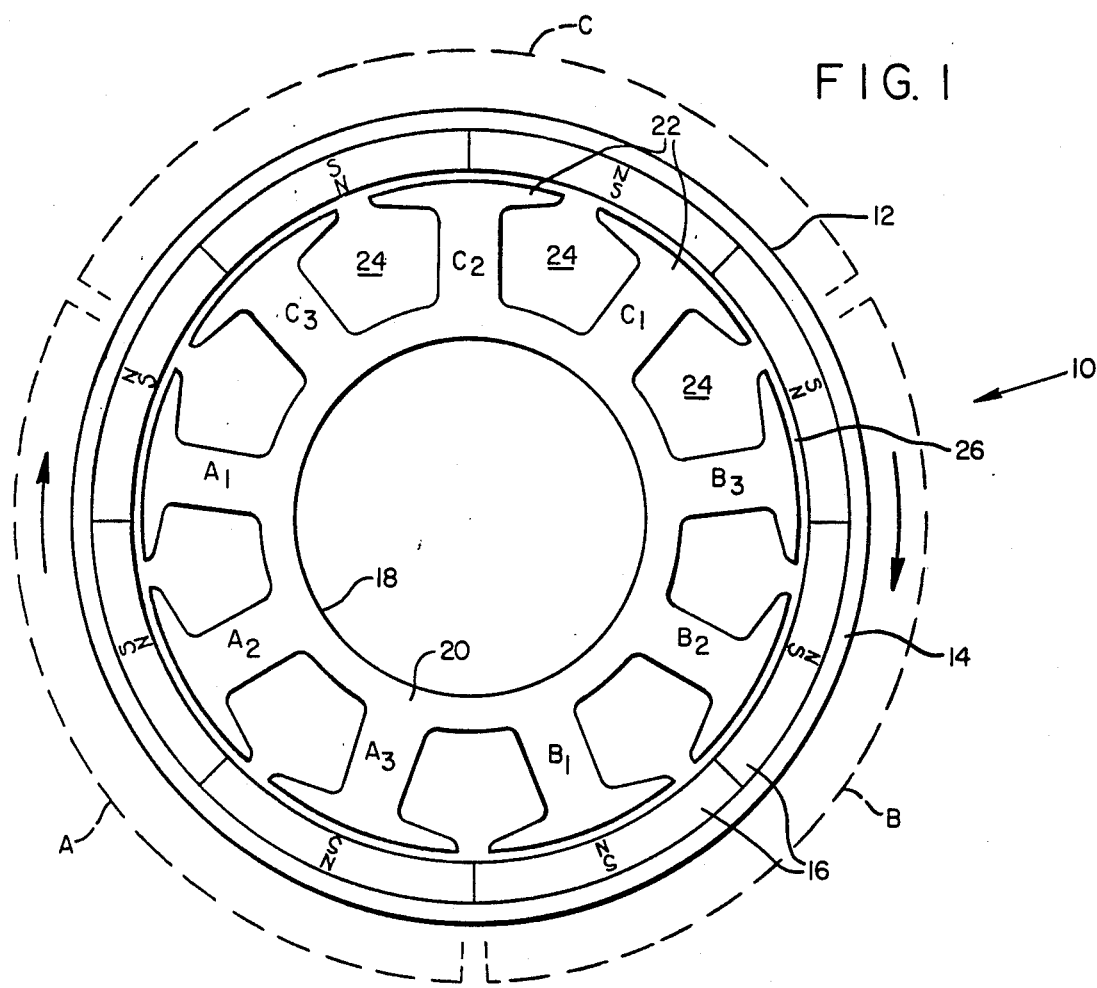
FIG. 1 is a schematic drawing of an exemplary radial-gap embodiment of the invention.

With reference to the exemplary embodiment of the invention shown in FIG. 1, the rotary electrical machine indicated generally as 10 comprises an external permanent magnet rotor assembly 12 comprising a ferromagnetic annular core or housing 14, on the inner surface of which is mounted a circular array of radially magnetized permanent magnets 16 of ceramic ferrite, rare earth cobalt or other suitable type. An armature 18 serves as the stator and comprises a laminated, ferromagnetic core 20 having protruding ferromagnetic poles 22 arranged in a circular array separated from each other by slots 24 located interstitially between the poles 22, and separated from the poles of the respective permanent magnets 16 by an annular radial gap 26.

The rotor and stator may be mounted for relative rotation with respect to each other by any suitable bearing assembly, such as that shown in Blom U.S. Pat. No. 4,540,906, which is incorporated herein by reference. Although the permanent magnet rotor assembly enables brushless commutation, the permanent magnet assembly could, alternatively, serve as the stator in cooperation with a mechanically commutated armature. As a further alternative, the armature could be the exterior element, serving either as stator or rotor, with the permanent magnet assembly located interior thereof.

Figure 1A:
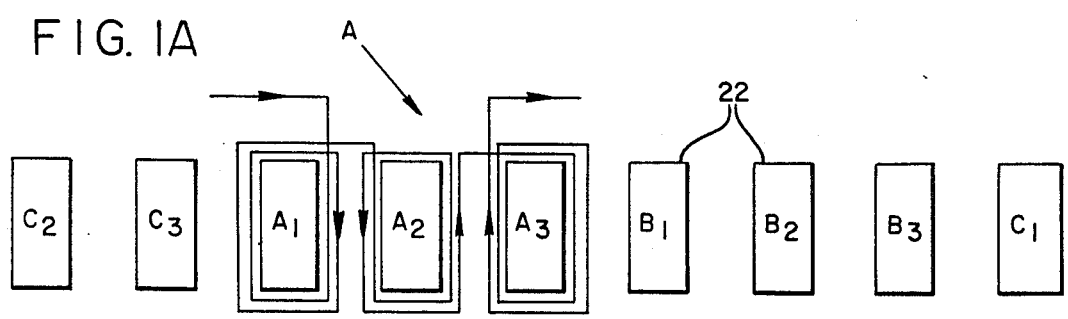
FIG. 1A is a schematic diagram of one embodiment of a winding suitable for the device of FIG. 1.
Figure 1B:
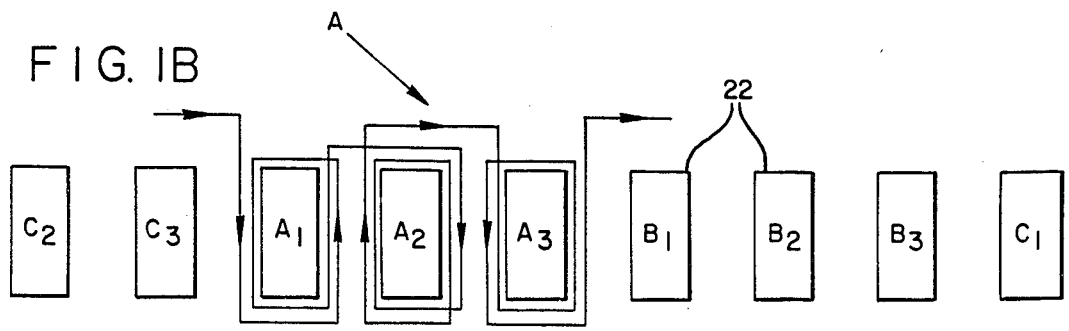
FIG. 1B is a schematic diagram of an alternative winding embodiment suitable for the device of FIG. 1.

The respective locations of the three phases A, B and C of the winding for the device of FIG. 1 are indicated in FIG. 1 by the respective sets of ferromagnetic armature poles A1, A2, A3; B1, B2, B3; and C1, C2, C3. As shown in FIG. 1A, which is a schematic radial view of the respective armature poles extended into a straight line, a typical phase such as A has three coils, each wound about a respective armature pole such as A1, A2, A3 and occupying a pair of slots located immediately adjacent to each side of the respective armature pole so that none of the coils overlaps any other coil. Phases B and C, respectively, are wound on their respective poles B1, B2, B3 and C1, C2, C3 identically to phase A, although the direction of the current depends on the commutation as is well-known to those skilled in the art. FIG. 1B shows an alternative configuration for phase A, the other two phases B and C being wound identically.

In both embodiments of the winding shown in FIGS. 1A and 1B, not only are the individual coils not superimposed upon each other, but the phases likewise are not superimposed upon each other. Rather, each phase A, B, C is limited to a respective exclusive sector, as shown in dashed lines in FIG. 1, of the circular array of armature poles 22. The avoidance of overlapping coils provides maximum compactness and efficiency by minimizing the volume of wire needed, while the avoidance of overlapping phases minimizes electromagnetic torque ripple and maximizes starting torque per unit volume of wire. Thus each pole is wound with a coil of a single phase and each coil therefore occupies the pair of slots 24 located immediately on each side of the respective armature pole 22.

On the other hand, the combination of eight permanent magnet poles (of the eight magnets 16) and nine ferromagnetic armature poles 22 minimizes the amplitude of the reluctance torque by permitting only a single alignment of permanent magnet and ferromagnetic poles at any one time. The numerical closeness of permanent magnet poles and armature poles also maximizes the frequency of the reluctance torque at 72 cycles per revolution, which is much higher than any of the significant frequencies of the rotary machine of FIG. 1. Both of these factors contribute significantly to minimizing the vibration of the machine.

The same principles apply to other embodiments of the invention featuring different numbers of permanent magnet poles and ferromagnetic poles, as long as the number of ferromagnetic poles equals 3(2n+1) and the number of permanent magnet poles equals 3(2n+1)±1, where n is an integer of 1 or more. The multicoil phases likewise satisfy the principles of the invention if the coils of each phase occupy 2n+2 slots and are located within a sector of the circular array of ferromagnetic poles encompassing 2n+1 ferromagnetic poles, and are wound with alternating polarities. It will be recognized that the device of FIG. 1 satisfies these relationships where n equals 1. By way of example only, rotary electrical machines having the following relationships would satisfy the invention:

| n | Ferromagnetic Poles | Permanent Magnet Poles | Slots Occupied By Single Phase | Ferromatnetic Poles in Single Phase Sector |
|---|---|---|---|---|
| 1 | 9 | 8 | 4 | 3 |
| 1 | 9 | 10 | 4 | 3 |
| 2 | 15 | 14 | 6 | 5 |
| 2 | 15 | 16 | 6 | 5 |
| 3 | 21 | 20 | 8 | 7 |
| 3 | 21 | 22 | 8 | 7 |
| 4 | 27 | 26 | 10 | 9 |
| 4 | 27 | 28 | 10 | 9 | and so on for higher values of n.

Figure 2:
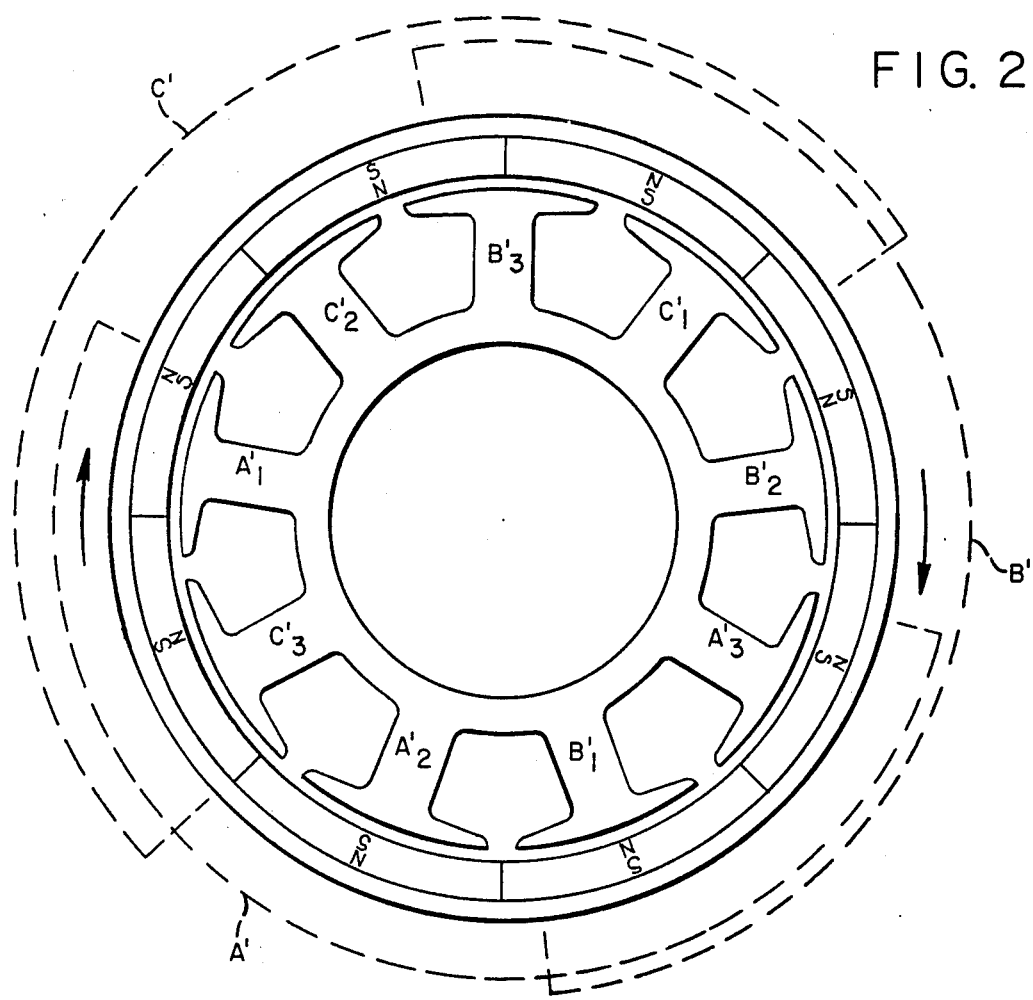
FIG. 2 is a schematic drawing, for comparison purposes, of a rotary machine having a rotor and stator structurally identical to those of FIG. 1, but with overlapping phases.
Figure 2A:
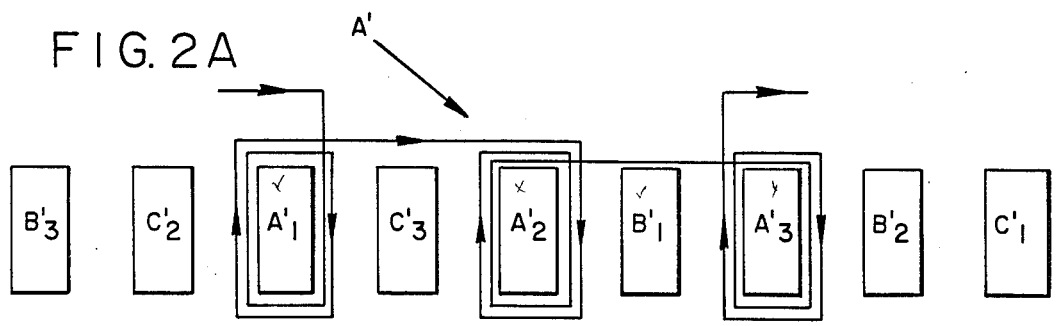
FIGS. 2A and 2B are schematic diagrams of alternative overlapping-phase windings usable with the machine of FIG. 2.
Figure 2B:
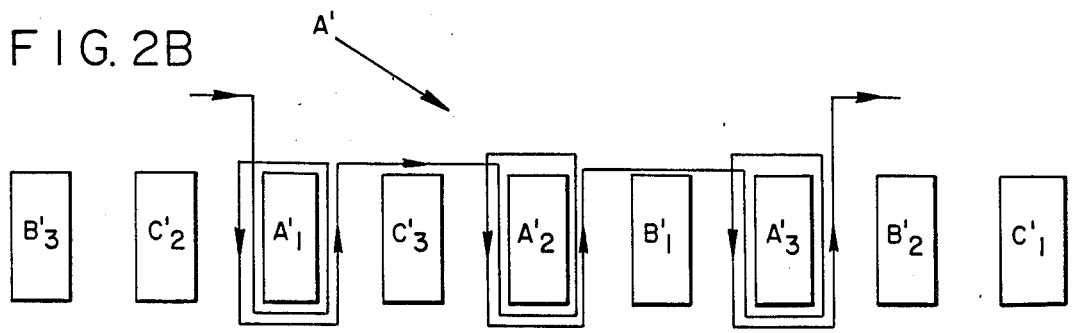

For comparison purposes, FIG. 2 depicts a rotary machine having the same number of permanent magnet poles and ferromagnetic poles as in FIG. 1 and having winding coils which do not overlap each other, but having multicoil phases A', B', C' which do overlap each other. FIGS. 2A and 2B show alternative embodiments of phase A', phases B' and C' being wound identically to phase A' in each case. Phase A' in each case has three coils each wound about a respective armature pole such as A'1, A'2 and A'3. Phases B' and C' respectively are wound on their respective poles, B'1, B'2, B'3 and C'1, C'2, C'3 identically to phase A'. FIG. 2 shows how the respective phases, because of their overlapping relationships, occupy sectors shown in dashed lines which are not limited to the narrow, mutually exclusive sectors of the invention of FIG. 1. Rather, the majority of each sector is overlapped by other sectors which, although minimizing the self-inductance of each phase because the respective coils thereof are all wound with the same polarity, increases torque ripple and reduces starting torque per unit volume of wire. This trade-off would be advantageous only in exceptionally high-speed motors where the self-inductance would introduce significant impedance into the winding. For most applications, however, the present invention is the superior one because of the minimized torque ripple and maximized starting torque per unit volume of wire which it achieves. The higher self-inductance of each phase does not outweigh these advantages at motor speeds which are normal for high-volume applications such as computer disk drive motors and fan motors.

The terms and expressions which have been employed in the foregoing specification are used therein as terms of description and not of limitation, and there is no intention, is the use of such terms and expressions, of excluding equivalents of the features shown and described or portions thereof, it being recognized that the scope of the invention is defined and limited only by the claims which follow.

What is claimed is:

1. A three-phase permanent magnet rotary electrical machine comprising:
  (a) an armature having a ferromagnetic core with 3(2n+1) protruding ferromagnetic poles arranged in a circular array separated from each other by the same number of slots located interstitially between said ferromagnetic poles, where n is an integer of 1 or more;
  (b) a permanent magnet assembly having a circular array of 3(2n+1)±1 magnetic poles;

(c) means for mounting said armature and said permanent magnet assembly for relative rotation with respect to each other; and (d) three-phase coil means mounted on said armature within said slots, each of the three phases of said coil means comprising multiple coils, each coil being wound about a respective ferromagnetic pole and each said pole being wound with a coil of a single phase, each coil occupying a pair of slots located immediately on each side of the ferromagnetic pole, and all of the coils of each phase being located within a predetermined sector of the circular array of ferromagnetic poles, the coils of each phase of said coil means being wound with alternating polarities, and occupying $2n+2$ slots and being located within a sector of said circular array of ferromagnetic poles encompassing $2n+1$ ferromagnetic poles.

2. The rotary electrical machine of claim 1 where $n=1$.

* * * * *